Inventor.
George E. Mills
by Heard Smith & Tennant
Attys.

July 1, 1941.   G. E. MILLS   2,247,394
TERRESTRIAL GLOBE
Filed Jan. 27, 1938   5 Sheets-Sheet 4

Inventor.
George E. Mills
by Heard Smith & Tennant.
Attys.

July 1, 1941. G. E. MILLS 2,247,394
TERRESTRIAL GLOBE
Filed Jan. 27, 1938 5 Sheets-Sheet 5

Inventor.
George E. Mills
by Heard Smith & Tennant.
Attys.

Patented July 1, 1941

2,247,394

UNITED STATES PATENT OFFICE 2,247,394

TERRESTRIAL GLOBE

George E. Mills, Brighton, Mass., assignor of one-half to William J. Brooks, Roslindale, Mass.

Application January 27, 1938, Serial No. 187,199

17 Claims. (Cl. 58—44)

This invention relates to terrestrial globes and particularly to that type of terrestrial globe which is provided with time mechanism for rotating the globe on its polar axis to indicate day and night effects and with means for rotating the globe bodily about an axis having approximately an angle of 23½° to said polar axis in order to indicate the changing seasons and the many effects caused by these changes.

One of the objects of the invention is to provide a novel means for thus operating the globe which is constructed so that the time mechanism may be readily disconnected from the globe-rotating means thereby to permit the globe to be manually rotated whenever it is desired to shift the position of the globe to indicate some particular time of day or some particular time or season of the year.

A further object of the invention is to provide novel means cooperating with the globe-rotating means to indicate the time at different locations on the globe corresponding to different positions of the globe in its turning movement about its polar axis, and also to indicate the season of the year corresponding to different angular positions of the polar axis.

A still further object of the invention is to provide a terrestrial globe with novel means for indicating on the globe the extent of the twilight zone.

A further object of the invention is to provide a terrestrial globe with novel means for indicating the angle at which the rays of the sun strike any portion of the earth's surface at different times of the year.

Further objects of the invention are to improve generally terrestrial globes in the particulars hereinafter set forth and then pointed out in the appended claims.

In the drawings 1 indicates a terrestrial globe which will have imprinted on its surface the usual map of the world. The globe is shown as a hollow sphere and is mounted on a globe-supporting member which in turn is carried by and situated within a suitable base 2, and is rotatable about a vertical axis, said globe being rotatable on the globe-supporting member about its polar axis 3 which makes an angle of approximately 23½° with said vertical axis.

The globe-supporting member is shown as an arm 4 which is mounted for rotation in a bearing member 5 that is carried by a web or bar 6 situated within the base 2, and the polar axis 3 of the globe is shown as a rod which is rigidly secured to said arm and which extends diametrically through the globe 1. At the outer end of the rod 3 is a screw 89 which extends through the shell of the globe and screws into the end of the rod, said screw serving as a trunnion about which the globe turns. The globe-supporting member 4 is shown as having a hub 7 which fits and rotates within the bearing member 5.

Means are provided for rotating the globe 1 about its polar axis and also for rotating the globe-supporting member 4 about its vertical axis. The means for rotating the globe about its polar axis comprises a shaft 8 which extends axially through the sleeve or hub 7 and which carries at its upper end a gear 9 that meshes with an intermediate gear 10 pivotally mounted on the member 4, said intermediate gear in turn meshing with a gear 11 which is rigid with the globe 1 and is rotatively mounted on the rod 3. With this construction rotation of the shaft 8 will operate to rotate the globe about its polar axis. The gears 9, 10 and 11 are so proportioned that each rotation of the shaft 8 will cause the globe to make one complete rotation about its polar axis.

There is also provided means rendered operative by the rotation of the shaft 8 to step the globe-supporting member forward one step for each rotation of the shaft 8, said means being so constructed that 365 rotations of the shaft 8 will cause one complete rotation of the globe-supporting member 4.

The sleeve or hub 7 has fast thereto a date dial 12 carrying on its peripheral face 13 the names of the twelve months of the year and an indication of the days of each month, said dial thus indicating the months of the year. This date dial is provided on its under side with a depending flange 14 having 365 ratchet teeth 15 formed on its under face. Cooperating with said ratchet teeth is a feed pawl 16 which is given a forward feeding movement for each rotation of the shaft 8. The ratchet teeth 15 and the amplitude of vibration of the feed pawl 16 are so proportioned that it takes 365 feeding movements of the feed pawl to give the date dial 12 one complete rotation.

The pawl 16 is pivotally mounted on one end of an oscillating arm 17 which extends diametrically across the base and is pivotally anchored thereto at its other end. For this purpose the base is shown as provided with an upstanding fork 18 between the arms of which a projection 19 on the arm 17 is received, said projection having a head 20 which prevents withdrawal of the projection from the fork. The arm 17 has an opening 21 in its central portion in which is received an eccentric 22 that is fast on the shaft 8, said arm, therefore, functioning as an eccentric strap for the eccentric. The eccentric 22 has rigid therewith a circular flange or collar 122 which is concentric with the shaft 8 and on which the arm 17 rests. With this arrangement each rotation of the shaft 8 will operate through the eccentric 22 to give the arm 17 a complete vibration thereby causing the feed pawl 16 to feed the date dial forward one step. Said pawl 16 may be held in operative engagement with the ratchet teeth 15 either by means of a spring or by means of a weight 23.

The arm 17 is shown as having a downturned ear 24 at its end to which the pawl 16 is pivotally connected by means of a screw 25.

Figure 2:
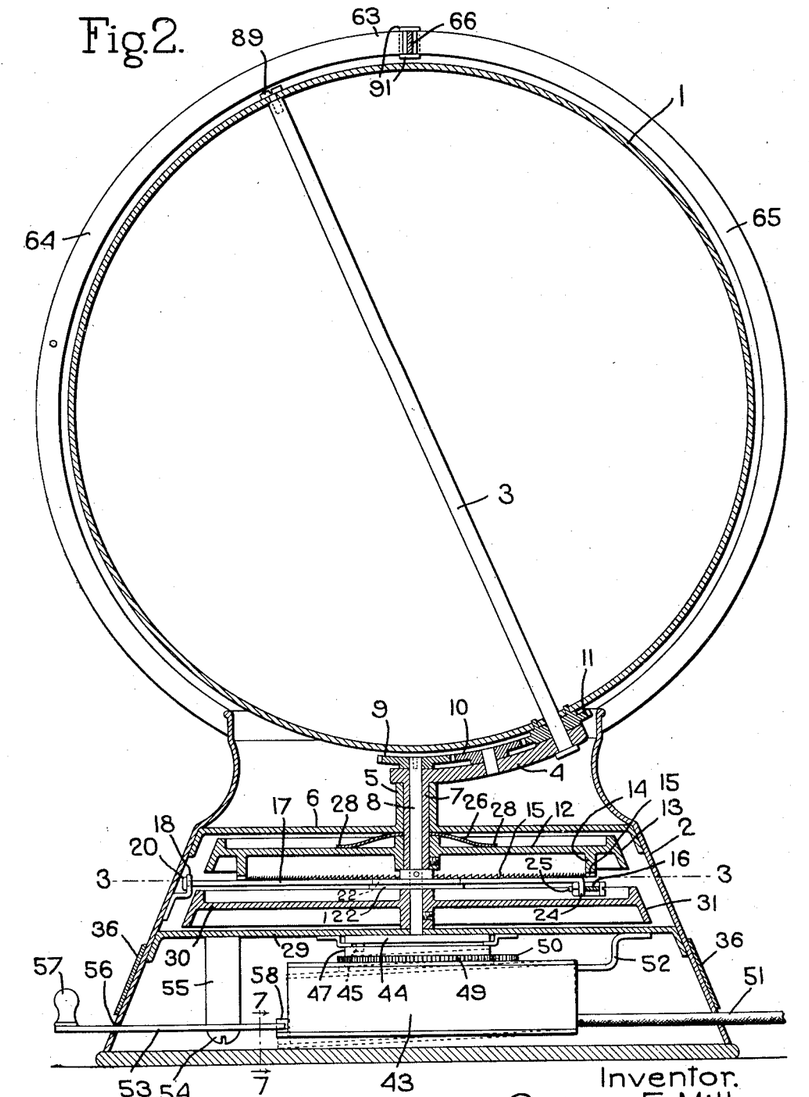
Fig. 2 is a vertical sectional view through said globe and appurtenances.

26 indicates a brake or retarding device which applies a retarding force to the date dial 12, the purpose of this being to prevent said dial from overrunning when it is stepped forward by the pawl 16. This brake device 26 is in the form of a spring plate which is provided with an aperture 27 through which the sleeve 7 extends and which is confined between the bar 6 and the date dial 12. This plate has a concavo-convex shape and when in place the outer end or peripheral portion 28 bears against the upper face of the date dial 12 while the central portion bears against the under side of the bar 6. This member 26 has such an initial shape that when it is assembled in the device as shown in Fig. 2 it will be flexed somewhat and thus the ends 28 thereof will have frictional contact with the date dial 12 while the central portion thereof will have frictional contact with the stationary bar 6. This member 26 thus applies a frictional drag to the date dial which prevents any overrunning thereof during operation of the globe.

The shaft 8 projects below the arm 17 and its lower end is journalled in a plate 29 extending across the base 2. Fast on the lower projecting end of the shaft is a time dial 30 which has the hours of the day imprinted on its peripheral face 31. The walls of the base 2 are provided with a series of twenty-four windows or openings 32, one for each hour of the day. Since the time dial 30 is fast on the shaft 8 said dial will rotate synchronously and in unison with the rotations of the globe 1 about its polar axis and, therefore, the readings through the windows 32 show the time of day for different locations upon the globe.

Rising from the base 2 is an arm 33 carrying from its upper end an eye 34 which indicates the direction of the sun, it being assumed that the sun is in a line extending from the center of the globe through the eye 34 outwardly into space.

The base 2 is provided with a window 35 through which a portion of the peripheral surface 13 of the date dial is visible and the reading which can be seen through the window 35 for any position of the globe-supporting member 4 indicates the date and thus the month of the year corresponding to said position. The upper edge of the window 35 is formed with an indication point 99 which is used in obtaining the correct reading.

36 is a time zone band which encircles the base and is shown as supported on projections 37 extending outwardly from the base. This time band has printed thereon names of cities in each of the twenty-four time zone divisions of the earth, and it can be adjusted around the base so as to bring any one of the designations thereon into indicating position, which is a position registering with the window 35. This band is shown as retained in any adjusted position by a window frame member 38 which is secured to the base by means of screws 39. This window frame member is provided with an opening 40 which registers with the window 35 in the base and it is also shown as provided with a plurality of smaller windows 41 which register with corresponding windows 32 in the base. This window frame member 38 is provided with ears 42 which overlie the upper edge of the band 36 and serve to clamp the band in any adjusted position. To adjust the band 36 it will be necessary to loosen one of the screws 39 slightly so as to relieve the clamping pressure.

Situated within the base 2 is a clock mechanism or time mechanism indicated generally at 43 and which is adapted to be coupled to the shaft 8 so as to rotate said shaft once every twenty-four hours. I will preferably employ a manually operated clutch of some suitable construction for thus coupling the time mechanism to the shaft 8. This clutch may be a friction clutch or a clutch in which the two clutch members have a positive clutching engagement. The latter type of clutch is herein illustrated and it comprises a clutch member 44 secured to the lower end of the shaft 8 and having a clutch pin 45 adapted to engage in a recess 46 formed in the upper face of the cooperating clutch member 47 which is mounted on a shaft 48 carried by the time mechanism 43, and which has rigid therewith a gear 49 that meshes with and is driven by a gear 50 actuated from the time mechanism. The time mechanism 43 may be either a mechanically operated time mechanism or an electrically operated time mechanism. That herein shown is an electrically operated time mechanism which receives its operating current through a cable 51. This time mechanism is so designed as to rotate the gear 49 and clutch member 47 once during each twenty-four hours and when the clutch member 47 is clutched to the clutch member 44 as shown in full lines, Fig. 9, the shaft 8 will be rotated once every twenty-four hours.

Means are provided for manually unclutching the two clutch members 44 and 47 whenever it is desired to rotate the globe by hand in order to demonstrate to pupils the relative position of the earth and sun at any particular time of day or any particular season of the year.

Figures 4, 5, 6, 7, 8, 9:
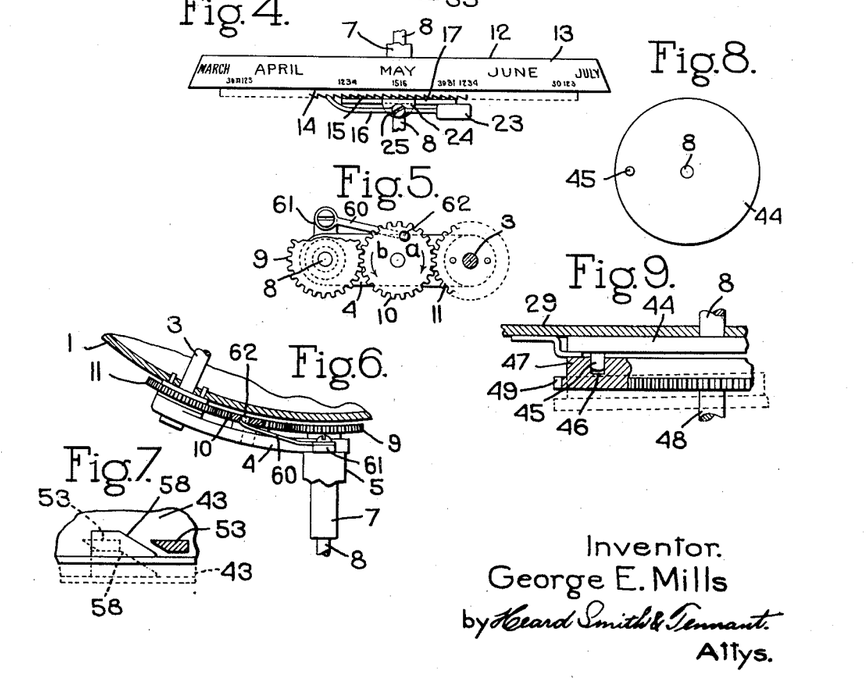
Fig. 4 is a side view of the date dial showing the means for actuating it.
Fig. 5 is a plan view of part of the gearing for rotating the globe about its polar axis.
Fig. 6 is a fragmentary sectional view showing the globe rotating gears in elevation.
Fig. 7 is an enlarged section on the line 7—7, Fig. 2.
Fig. 8 is a face view of one of the members of the clutch by which the time mechanism is clutched to the globe-rotating means.
Fig. 9 is a fragmentary sectional view of said clutch.

For this purpose the time mechanism 43 is mounted on and carried by a resilient supporting arm 52 which is secured to the plate 29, and means are provided for moving the time mechanism bodily downward to withdraw the clutch member 47 from its clutching engagement with the member 44 as shown in dotted lines in Figs. 2 and 9. For this purpose there is provided a clutch-controlling lever 53 pivoted at 54 to a supporting bracket 55, said lever extending through a slot 56 in the base 2 and being provided at its outer end with a thumb piece 57. The inner end of the lever 53 is adapted to engage a cam 58 (see Fig. 7) with which the time mechanism 43 is provided. The swinging movement of the inner end of the lever toward the left in Fig. 7 will cause it to engage the cam 58 and thereby force the cam and the time mechanism 43 downwardly into the dotted line position. The clutch member 47 will thus be unclutched from the clutch member 44. The resiliency of the supporting arm 52 permits this operation, and also holds the two clutch members normally in their clutching relation when the lever is in its inoperative position.

When the clutch members 44 and 47 are coupled the time mechanism 43 will rotate the shaft 8 and the globe about its polar axis once every twenty-four hours, and the rotation of the shaft 8 and cam 109 will operate through the arm 17 and pawl 16 to advance the date dial and the globe-supporting member 4 with a step-by-step movement about the vertical axis, said member 4 making one complete rotation each year. Hence, when the clutch is operative the position of the globe about its polar axis will give the correct night and day positions of any location on the surface of the globe and the rotation of the globe-supporting member 4 will indicate at all times the correct position of the axis of the earth relative to its orbital movement about the sun.

When the clutch 44, 47 is disengaged as shown by dotted lines in Figs. 2 and 9 then the globe may be rotated manually in a forward or west to east direction into any desired position about its polar axis, and at each complete rotation of the globe the date dial and the globe-supporting member 4 will be given one forward step. This makes it possible to use the globe for the instruction of pupils, and to demonstrate to the pupils the rotation of the earth about its axis and the orbital movement of the earth about the sun.

It is customary to place on terrestrial globes the so-called "ecliptic" line 59 which indicates the plane of the earth's orbit. I have provided herein a stop device which becomes operative when the globe is manually rotated backwardly, that is, in an east to west direction, to stop further rotation of the globe about its polar axis when it has been brought into a position with the "ecliptic" line in a horizontal plane. This stop device is shown as a resilient stop pawl 60 which is secured at one end to an ear 61 extending laterally from the globe-supporting member 4 and which bears against the under side of the intermediate gear 10. As shown best in Figs. 5 and 6 this gear 10 is formed with a recess or aperture 62 which cooperates with the stop 60 for limiting rotation of the gear 10 in one direction.

When the globe is being rotated forwardly about its polar axis the gear 10 will be rotating in the direction of the arrow $a$ in Fig. 5. The pawl 60 freely admits continued rotation of the gear 10 in this direction. When, however, the globe is rotated backwardly the gear 10 will be rotating in the direction of the arrow $b$ in Fig. 5, and when during such rotation the opening or recess 62 registers with the end of the pawl 60 the latter will snap into the recess and thus prevent further backward rotative movement of the gear 10. The recess 62 is so positioned that at this time the globe will be in a position with the ecliptic line 59 occupying a horizontal plane (see Fig. 16).

When the globe is in this position and is locked against further backward rotation about its axis, the manual application of continued pressure against the surface of the globe in a direction tending to continue its backward rotation will have the effect of turning the entire globe-supporting member 4 about its vertical axis and thus it is possible to quickly shift the position manually of the globe-supporting member to bring the globe into a position corresponding to the position which the earth has in its orbital movement on any particular day of the year. When the globe has been thus adjusted for demonstrating purposes then the globe may be rotated forwardly by hand for demonstrating the rotation of the earth about its polar axis on said day of the year.

The clutch 47, 44 is constructed so that the two clutch members can have a clutching relation only when they have a single predetermined relative position, and this is accomplished by providing the clutch member 44 with a single pin 45 and providing the clutch member 47 with a single recess 46.

As a result of this construction the globe and the time dial 30 will always be properly synchronized with the time mechanism 43 when the clutch is operative.

If it is assumed that the clutch has been disengaged in order to manually operate the globe for demonstration purposes, then when the clutch lever 53 is restored to its normal position the resiliency of the supporting bracket 52 will tend to raise the time mechanism 43 into its coupling relation with the clutch member 44. If at such time the clutch members 44 and 47 have a relative angular position in which the clutch pin 45 is out of line with the recess 46, then the globe may be rotated forwardly manually until the clutch member 44 has been turned into a position in which the clutch pin 45 registers with the recess 46, at which time the resiliency of the supporting arm 52 will cause the clutch to be reengaged. The position which the globe has in its polar rotation at the time that the clutch is thus automatically reengaged will correspond exactly to the actual time of the day. The time mechanism 43 continues in operation during the time that the clutch is disengaged, and consequently, the clutch member 47 is being moved forward continuously by the time mechanism whether the clutch is engaged or disengaged, so that the position of the clutch member 47 always corresponds to the actual time of day. With this construction, therefore, if the clutch has been operated manually for demonstration purposes and the globe has been turned on its axis into a position corresponding to some hour other than the actual time, said globe and time dial can only be again coupled to the time mechanism for the purpose of being actuated thereby, when the globe and time dial have been turned manually into a position corresponding to the actual time, or, in other words, into a position corresponding to that which the clutch element 47 has assumed during the manual demonstration.

Figure 1:
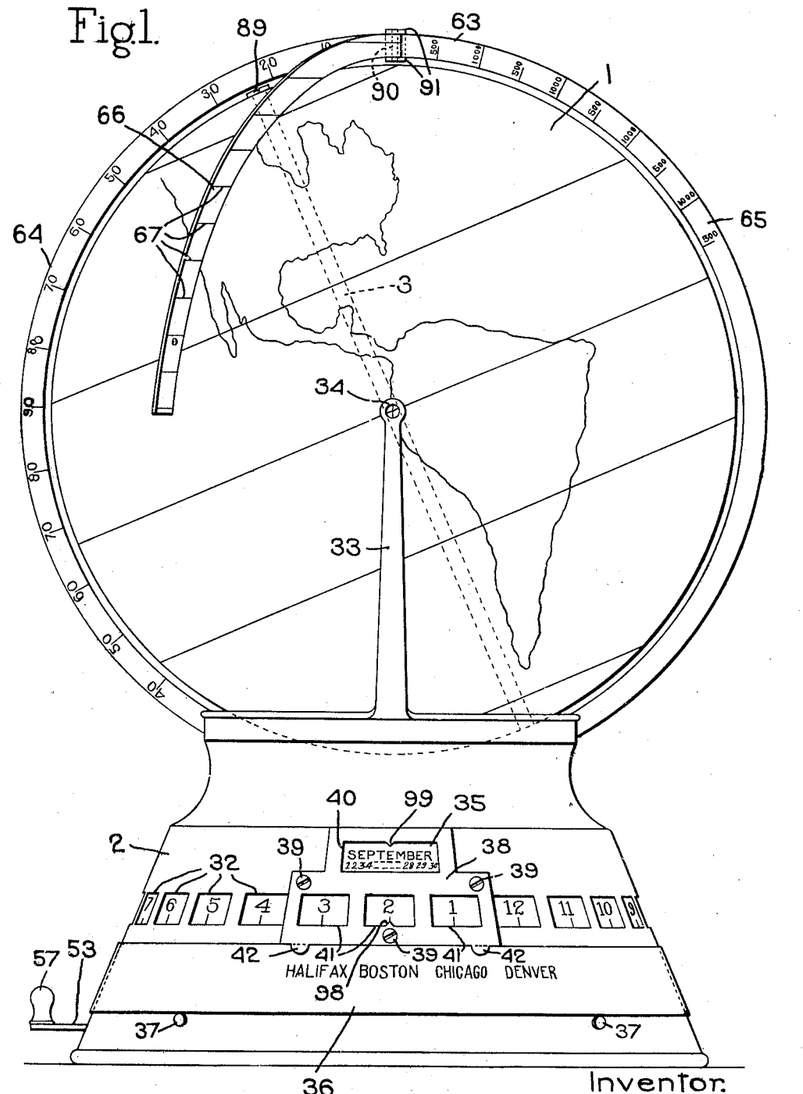
Fig. 1 is a front view of a terrestrial globe and appurtenances thereto embodying my invention.

Surrounding the globe and secured to the base 2 is the stationary sunrise-sunset bar 63, the left-hand portion 64 of which in Fig. 1 constitutes a sunrise bar and the right-hand portion 65 of which constitutes a sunset bar. The upper portion of the bar 63, that is, the portion embraced in an angle of approximately 23½° each side of the top center of said bar, changes from the sunset to the sunrise part of the bar as the globe-supporting member 4 rotates about its vertical axis and as the seasons change. These bars can be graduated in degrees or miles as desired, and in Fig. 1 the sunrise bar is graduated in degrees and the sunset bar in miles.

Figure 12:
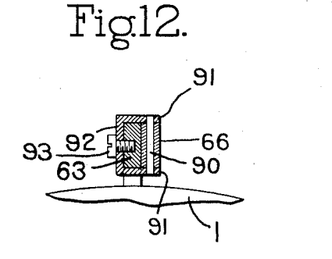
Fig. 12 is a sectional view showing the manner in which the gauge member is secured to the globe.

66 indicates a gauge member which is pivoted to the sunrise-sunset bar 63 at the top thereof. This gauge is curved to follow the surface of the globe and may be swung about its pivot into any position between the sunrise and the sunset sides of the bar 63. This gauge can be conveniently used to indicate the inclination with which the sun's rays strike the earth at any portion thereof, and for this purpose said gauge is provided with graduation lines 67 which are parallel to each other and all of which extend at right angles to the vertical axis about which the globe-supporting member rotates. When the gauge member is swung into a position in line with the sunspot 34, the graduation lines 67 on said gauge will indicate the angle at which the sun's rays strike the portion of the earth underneath the gauge, and by turning the globe on its polar axis with the gauge in this position the declination or angular position of the sun's rays relative to any portion of the earth's surface for any day in the year can be readily observed. This gauge 66 is pivotally mounted on a pivot pin 90 carried in ears 91 of a clip 92 which embraces the bar 63 and is secured thereto by a set screw 93 (see Fig. 12). The opposite side of the gauge 66 from that which carries the graduation marks 67 may have markings 101 similar to markings 102 on the lower half of the sunrise bar 64 but in a reverse order. These markings may be used to indicate antipodal points on the globe. When the gauge 66 is swung against the sunset bar then the corresponding markings on said gauge and the lower part of the sunrise bar indicate antipodal points on the globe.

Figure 10:
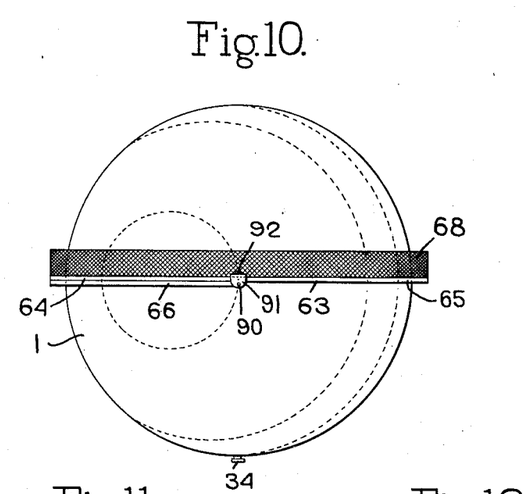
Fig. 10 is a top plan view of a globe embodying the invention illustrating the means for indicating the twilight zone.
Figure 11:
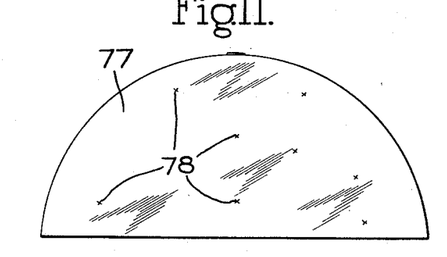
Fig. 11 is an attachment in the form of a celestial canopy designed to indicate the position of the stars.

For indicating the twilight zone I have provided a twilight-indicating member 68 preferably in the form of a transparent or semi-transparent band which is secured to the sunrise-sunset bar 63 and is located on the night side thereof as shown in Fig. 10. This twilight band 68 shows the extent of the globe surface in which twilight conditions exist at any time.

The band 68 can conveniently be made of fine wire mesh or it may be made of any other material which is sufficiently transparent so that the surface of the globe can be seen therethrough.

Normally the time zone band will be adjusted so that the name of the city in the time zone within which the globe is being used will be in indicating position, this position being directly under the sunspot arm 33 and directly under the window 35 through which the month of the year is readable. As illustrated in Fig. 1 of the drawings the time zone band 36 is adjusted for use in the time zone having Eastern standard time.

The window frame 38 is shown as having two indicator projections 98, 99, the indicator projection 98 identifying the correct window 32 through which to read the time on the time dial for the time zone for which the band 36 is set or adjusted, and the indicator projection 99 serving to indicate the day of the month.

Since there are twenty-four windows 32, one for each of the time zones into which the earth is divided, and since the notation on the time zone band 36 indicates a city in each of the twenty-four time zones, the construction herein illustrated provides means for comparing the time in any time zone of the earth's surface with the actual time at the point where the apparatus is being used.

If, for instance, instead of being used in the Eastern time zone the globe were being used in the Mountain time zone then the band 36 would be adjusted to bring the designation "Denver" into the indicating position directly beneath the sunspot arm 33, and the readings through the various windows 32 would give the correct time in all the other time zones as compared with that in the Mountain time zone provided that the globe was first set to the correct time for the Mountain time zone before attempting to use the globe.

Figures 13, 14, 15:
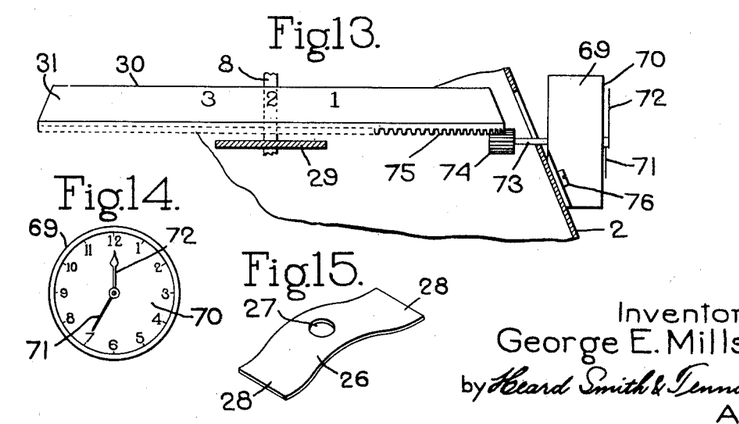
Fig. 13 illustrates means by which the time dial can be utilized to indicate the time of day.
Fig. 14 is a front view of the clock face shown in Fig. 13.
Fig. 15 is a view of the brake device.

Although the time is indicated by the reading on the time dial 30 so long as the clutch 44, 47 is operatively connecting the time mechanism with the shaft 8, yet, if desired, I may employ a clock face and clock hands moving thereover which are actuated by the time dial for the purpose of indicating the time. Such a construction is shown in Fig. 13 wherein 69 indicates a casing containing a train of gearing and provided with a clock face 70 with which hour and minute clock hands 71, 72 cooperate. These clock hands are driven through suitable gearing from a shaft 73 provided with a pinion 74 that meshes with ratchet teeth 75 formed on the under side of the peripheral edge of the time dial 30. The gearing will be so proportioned that the hour-hand 71 will make two rotations for each rotation of the time dial 30 while the minute-hand 72 will make a complete rotation each hour.

The casing 69 is shown as secured to the base 2 by means of suitable screws 76.

77 indicates a celestial canopy which may be used for giving instruction relative to the position of the stars. This canopy is preferably made of transparent material and has the positions of stars indicated thereon as shown at 78. Means are provided for securing said canopy to the polar axis 3 so that it will enclose the upper half of the globe. Being of transparent material it is possible to see the globe therethrough and the star indications 78 on the canopy will give the continuing location of the stars relative to any position on the globe as the latter is rotating about its polar axis. While any suitable means for securing the canopy to the rod 3 may be employed I have shown in Fig. 18 a simple construction adapted for this purpose. The trunnion screw 89a at the upper end of the rod 3 is provided with a squared portion 80 adapted to be received in a square opening 81 formed in the center of the canopy 77. 82 is a clamping screw screw-threaded into the squared portion 80 and which serves to lock the canopy to the trunnion screw 89a.

The celestial canopy 77 is thus detachably secured to the globe and may be readily assembled therewith when it is to be used and as readily removed from the globe when desired.

To assemble the canopy it is placed over the globe at one side of the bar 63 and then may be slid under the bar 63 and over the top of the globe into its correct position. When the globe-supporting member 4 is in a position in which the North Pole of the globe is at one side of the bar 63, the trunnion screw 89a and clamping screw 82 will be accessible to be manipulated for attaching the canopy to the globe or removing it therefrom.

Figures 16, 17, 18, 19, 20, 21:
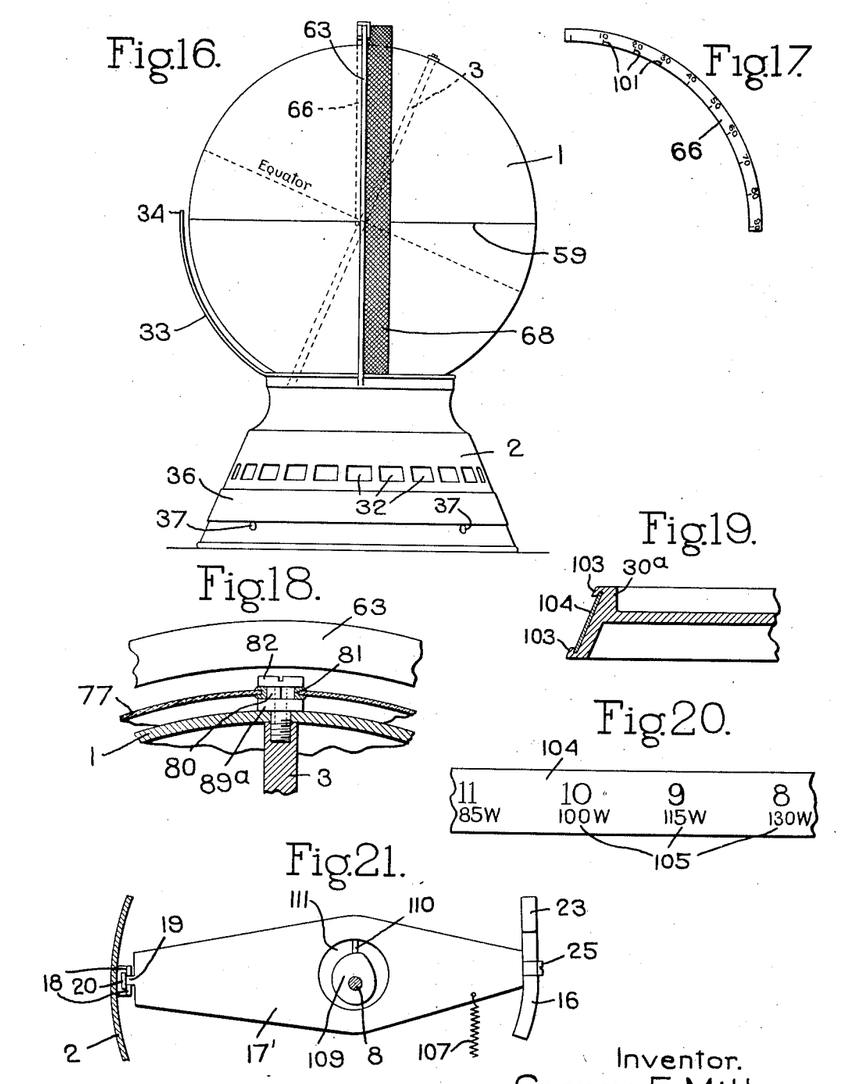
Fig. 16 is a side view of the globe showing it in a position with the ecliptic line in a horizontal plane.
Fig. 17 is a side view of the gauge 66.
Fig. 18 is a fragmentary sectional view showing the manner of attaching the celestial canopy to the globe.
Fig. 19 is a fragmentary view showing a different form of time dial.
Fig. 20 is a fragmentary view illustrating the removable notation-carrying strip for the time dial.
Fig. 21 is a view similar to Fig. 3 showing a cam instead of an eccentric for operating the feed pawl.

The trunnion screw 89 shown in Fig. 2 is not adapted to receive the celestial canopy but it will be understood that if the globe is to be equipped with the celestial canopy then a trunnion screw 89 of the type shown in Fig. 18 will be used.

The markings on the time dial 30 may be imprinted directly on the surface 31 of the dial as shown in Fig. 13, or said markings may be on a strip of paper which is detachably applied to said dial. When the latter construction is employed said strip is interchangeable so that strips with different markings and different notations thereon can be employed if desired.

Such a construction is shown in Figs. 19 and 20. In Fig. 19, which shows a fragmentary sectional view of a time dial indicated at 30a, said time dial is formed on its periphery with two retaining lips 103 which are adapted to embrace the edges of and retain in place a strip 104 of paper or similar material on which the markings or notations are imprinted. The strip shown in Fig. 20 has not only the hours imprinted thereon but also the longitude indications as indicated at 105. These longitude indications show that when it is a certain time in any city, it will be one hour earlier in another city situated 15° west of the given city, or one hour later in another city, situated 15° east of the given city. For instance, when it is 11 o'clock in a city whose longitude is 85° W., it will be 10 o'clock in a city located at 100° W. longitude. This strip can be readily applied to or removed from the periphery of the time dial through one of the windows 32. These strips 104 may also have imprinted thereon any suitable data.

If desired a similar interchangeable notation-bearing strip may be used in connection with the date dial 12.

Figure 3:
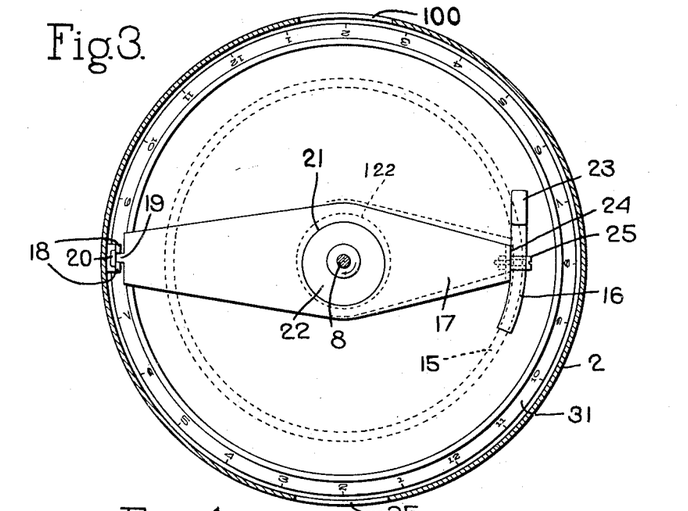
Fig. 3 is a section on the line 3—3, Fig. 2.

In the construction illustrated in Fig. 3 an eccentric 22 is employed for oscillating the arm 17 which carries the feed pawl 16. In place of this eccentric I may use a face cam 109 as shown in Fig. 21, in which case a spring 107 will be employed for holding an arm 17' in engagement with the cam face. The cam 109 is shown as operating in an opening 111 in the arm 17' and said arm is provided with a follower or pin 110 bearing against the periphery of the cam.

With the construction shown in Fig. 3 the feeding movement of the date dial will occur during one-half of the rotation of the shaft 8. With the cam construction shown in Fig. 21 each forward feeding movement is distributed throughout substantially the entire rotation of the shaft 8. The base is provided with a sight opening 100 situated diametrically opposite to the sight opening 35 and through which a portion of the face 13 of the date dial 12 may be seen. This opening 100 is convenient for indicating to pupils the season in the Southern Hemisphere at the date indicated by the reading through the window 35. For instance, with the date dial set as shown in Fig. 1, the reading through the window 100 would indicate that it was the spring season of the year in the Southern Hemisphere at the time when it is the fall season of the year in the Northern Hemisphere as indicated by the reading through the window 35.

The construction herein illustrated includes a fixed base member 2 having the fixed indication marks 99 and 98, within which base are located the moving dials 12 and 30, the clock mechanism 43 and the driving connections between the clock mechanism and the globe. Since the indicating marks are fixed, the notations on the dials will always be read from a fixed position, that is, a position in front of the globe and it will not be necessary to turn the base around in order to obtain a reading as would be the case if the dials were fixed and the indicators were moving.

I claim:

1. A terrestrial globe comprising a base, a globe-supporting member carried thereby for rotation about a vertical axis, a globe mounted on said globe-supporting member with its polar axis inclined to the vertical axis, said globe being rotatable about said polar axis, time mechanism, driving connections between said time mechanism and the globe for rotating the latter, and a manually controlled clutch independent and separate from the time mechanism for operatively connecting said time mechanism to or entirely disconnecting it from said driving connections.

2. A terrestrial globe comprising a base, a globe-supporting member carried thereby for rotation about a vertical axis, a globe mounted on said globe-supporting member with its polar axis inclined to the vertical axis, said globe being rotatable about said polar axis, time mechanism, driving connections between said time mechanism and the globe for rotating the latter, and means for bodily moving the time mechanism to bring it into and out of coupling relation with said driving connections.

3. A terrestrial globe comprising a base, a globe-supporting member carried thereby for rotation about a vertical axis, a globe mounted on said globe-supporting member with its polar axis inclined to the vertical axis, said globe being rotatable about said polar axis, time mechanism, a resilient support for the time mechanism which permits bodily movement thereof, driving connections between said time mechanism and said globe for rotating the latter, said time mechanism normally being coupled to the driving connections, and means to move the time mechanism bodily to disrupt the operative coupled relation between it and the driving connections whereby the globe is free to be rotated about its polar axis independently of the time mechanism.

4. A terrestrial globe comprising a base, a globe-supporting member mounted in said base for rotative movement about a vertical axis, a globe carried by said globe-supporting member, and rotatable about its polar axis which is inclined to said vertical axis, time mechanism, direct power-conveying driving connections between said globe and the time mechanism by which the globe is rotated about its polar axis once every twenty-four hours by the time mechanism, said driving connections being permanently connected to the globe, a manually controlled clutch for connecting said driving connections to or disconnecting them from the time mechanism at will, said globe being free to be rotated manually about its polar axis when the driving connections are disconnected from the time mechanism, said driving connections being then free to be actuated by the manual rotation of the globe, and means rendered operative by said driving connections, whether actuated manually by the manual turning of the globe or actuated by the time mechanism, to step the globe-supporting member forward one step in its rotative movement at each rotation of the globe.

5. A terrestrial globe comprising a base, a globe-supporting member mounted in said base for rotative movement about a vertical axis, a globe carried by said globe-supporting member and rotatable about its polar axis which is inclined to the vertical axis, time mechanism, driving connections between said globe and the time mechanism by which the globe is rotated about its polar axis once every twenty-four hours, a time dial within the base rotating synchronously with said globe, said base having openings, one for each time zone, through which the time dial may be read, a manually controlled clutch for coupling said driving connections to or disconnecting them from said time mechanism, said clutch comprising a clutch element rotating continuously with the time mechanism and a cooperating clutch element connected to the driving connections, one of said clutch elements having a clutch projection and the other having a recess adapted to receive the clutch projection for coupling the clutch members together only when they have a single predetermined relative position, and clutch-actuating means accessible from outside the base.

6. A terrestrial globe comprising a base, a globe-supporting member carried thereby for rotation about a vertical axis, a globe mounted on said globe-supporting member with its polar axis inclined to the vertical axis, said globe being rotatable about its polar axis, a date dial situated in the base and rigid with the globe-supporting member, globe-rotating means, a time dial also situated within the base and rotatable about said vertical axis synchronously with the rotation of the globe about its polar axis, an eccentric carried by said time dial, a lever pivoted to the base and actuated by said eccentric, and means actuated by said lever to step the date dial forward one step for each rotation of the time dial.

7. A terrestrial globe comprising a base, a globe-supporting member carried thereby for rotation about a vertical axis, a globe mounted on said globe-supporting member with its polar axis inclined to the vertical axis, said globe being rotatable about its polar axis, a date dial situated in the base and rigid with the globe-supporting member, globe-rotating means, a time dial also situated within the base and rotatable about said vertical axis synchronously with the rotation of the globe about its polar axis, an eccentric carried by said time dial, a lever pivoted to the base and actuated by said eccentric and making a complete to-and-fro oscillation for each rotation of the globe, and means actuated by said lever at each complete oscillation thereof to give the date dial a forward rotative step.

8. A terrestrial globe comprising a hollow base, a globe-supporting member mounted therein for rotation about a vertical axis, a globe carried by said globe-supporting member with its polar axis inclined to said vertical axis, globe-rotating means including a driving shaft coaxial with the globe-supporting member, means actuated by the rotation of the driving shaft to give the globe-supporting member a forward rotative step for each complete rotation of the globe about its polar axis, and a date dial rigid with the globe-supporting member and situated within the base and also having the months of the year imprinted thereon, said base having in its side wall two oppositely disposed windows through which the date dial may be read, one window being situated so that the notation on the dial seen therethrough indicates the current month.

9. A terrestrial globe comprising a base, a globe-supporting member therein rotatable about a vertical axis, a globe carried by said member with its polar axis inclined to the vertical axis, said globe being rotatable about its polar axis, time mechanism within the base, driving connections between the time mechanism and the globe by which said globe is rotated about its polar axis once every twenty-four hours, a clutch means to connect the time mechanism to or disconnect it from the driving connections, said globe being manually rotatable about its axis when the clutch is disconnected, a time dial within the base connected to the driving connections to rotate about said vertical axis synchronously with the rotation of the globe, a clock face, separate from the time mechanism and exposed on the outside of the base, hour- and minute-hands rotatable over said clock face, and means actuated by the time dial for rotating said hour- and minute-hands.

10. A terrestrial globe comprising a base, a globe-supporting member mounted in said base for rotative movement about a vertical axis, a globe carried by said globe-supporting member and rotatable thereon about its polar axis which is inclined to said vertical axis, time mechanism, driving connections between said globe and the time mechanism by which the globe is rotated about its polar axis once every twenty-four hours, said driving connections including a rotatable shaft situated axially of the globe-supporting member, means rendered operative by rotation of said shaft to step the globe-supporting member forward one step in its rotative movement at each rotation of the globe, and a brake device applying a retarding force to the rotation of the globe-supporting member which prevents it from overrunning when it is given its forward rotative step.

11. A terrestrial globe comprising a base, a globe-supporting member mounted in said base for rotative movement about a vertical axis, a globe carried by said globe-supporting member and rotatable thereon about its polar axis which is inclined to said vertical axis, an electric clock mechanism, driving connections between said clock mechanism and said globe by which the latter is rotated about its polar axis once every twenty-four hours, said driving connections including a rotatable shaft situated coaxially with the globe-supporting member and means rendered operative by rotation of said shaft to step the globe-supporting member forward one step in its rotative movement at each rotation of the globe.

12. A terrestrial globe comprising a hollow base having twenty-four windows, one for each time zone, a globe-supporting member mounted in the base for rotative movement about a vertical axis, a globe carried by said globe-supporting member and rotatable thereon about its polar axis which is inclined to said vertical axis, a shaft extending axially of the globe-supporting member and operatively connected to the globe to rotate synchronously therewith, time mechanism to rotate said shaft, a time dial carried by the shaft and situated entirely within the base, said time dial being readable through said windows and having notations thereon to indicate the twenty-four hours of the day.

13. A terrestrial globe comprising a hollow base having a window and an indicating member fixed relative to the window and visible therethrough, a globe-supporting member mounted in the base for rotative movement about a vertical axis, a globe carried by said globe-supporting member and rotatable thereon about an axis which is inclined to the vertical axis, time mechanism within the base, driving connections between the time mechanism and the globe by which the globe is rotated about its polar axis once every twenty-four hours, said driving connections including a vertical shaft, and an indicating dial within the base fast on said shaft, a portion of the indicating dial being visible through said window, said fixed indicating member indicating the correct readings on the visible portion of the dial for any position of the globe whether the latter be operated by the time mechanism or manually.

14. A terrestrial globe comprising a hollow base having two windows, one above the other, a globe-supporting member enclosed within the base and mounted for rotation about a vertical axis, a globe carried by the globe-supporting member and rotatable thereon about an axis which is inclined to the vertical axis, time mechanism, driving connections between the time mechanism and the globe by which the latter is rotated about its inclined axis once every twenty-four hours, said driving connections including a vertical shaft rotating synchronously with the globe and having an axis coinciding with that of the globe-supporting member, means actuated by each rotation of said shaft to step the globe-supporting member forward, a time dial rigid with said shaft and visible through one window, and a date dial carried by the globe-supporting member and rotated synchronously therewith and visible through the other window.

15. A terrestrial globe comprising a hollow base having a plurality of windows, one for each time zone, one window being provided with an indicating element, a globe-supporting member enclosed within the base and mounted for rotation about a vertical axis, a globe carried by the globe-supporting member and rotatable thereon about an axis which is inclined to the vertical axis, time mechanism, driving connections between the time mechanism and the globe by which the latter is rotated about its axis once every twenty-four hours, a time dial carried by said driving connections and rotating synchronously with the globe, said time dial being visible through said windows, means to step the globe-supporting member forward one step at each rotation of the globe, and a time zone band encircling the base beneath the windows and carrying at spaced intervals thereon a time zone designation for each time zone, said band being adjustable about the base to bring any desired time zone designation into a position beneath the window having the indicating element, thereby making the globe equally usable in any time zone.

16. A terrestrial globe comprising a base, a globe-supporting member mounted therein for rotation about a vertical axis, a globe carried by said member with its polar axis inclined to said vertical axis, time mechanism for giving the globe a daily rotation about its polar axis, a clutch for connecting the globe to or disconnecting it from the time mechanism, said globe having an ecliptic line thereon and being rotatable manually about its polar axis in either direction when said clutch is disengaged, means actuated by each rotation of the globe about its polar axis in one direction to give the globe-supporting member a forward step about its axis, a stop mechanism cooperating with said means to prevent further backward manual rotation of the globe when it has been turned backwardly into a position to bring the ecliptic line into a horizontal plane, said stop mechanism permitting free forward rotation of the globe.

17. A terrestrial globe having a base, a globe-supporting member mounted in said base for rotation about a vertical axis, a globe rotatably carried by said member for rotation thereon about an axis at an inclination to said vertical axis, means including a vertical shaft coaxial with said vertical axis of the globe-supporting member to rotate the globe about its inclined axis once every twenty-four hours, a ratchet member rigid with the globe-supporting member, a pawl cooperating with said ratchet, and means rendered operative by the rotation of said shaft to give the pawl an operative movement at each rotation of the shaft.

GEORGE E. MILLS.